United States Patent [19]

Spencer et al.

[11] Patent Number: 5,309,672
[45] Date of Patent: May 10, 1994

[54] SUBMERGED PLATFORM STRUCTURE FOR OPEN OCEAN MACROALGAL FARM SYSTEMS

[75] Inventors: Dwain F. Spencer, Half Moon Bay; Larry L. Lewis, San Rafael, both of Calif.

[73] Assignee: Electric Power Research Institute, Inc., Palo Alto, Calif.

[21] Appl. No.: 956,539

[22] Filed: Oct. 5, 1992

[51] Int. Cl.[5] .................... A01G 7/00; A01H 13/00; A01K 6/00; E02B 3/06
[52] U.S. Cl. .................... 47/1.4; 119/208; 119/223; 119/239; 405/21; 405/23; 405/24
[58] Field of Search .................... 47/1.409, 1.401, 1.402, 47/1.403, 1.404, 1.405, 1.406, 1.407, 1.408, 1.4; 119/2, 3, 4; 405/21, 23, 24

[56] References Cited

FOREIGN PATENT DOCUMENTS 4047836 12/1974 Japan .
0061241 4/1985 Japan .
164419 7/1991 Japan .
11920 1/1992 Japan .

OTHER PUBLICATIONS

Makita H. et al, "Preliminary Design of an Ocean--Based Mariculture-Otec Experimental Facility" (Abstract only).
Othmer D. F. et al, "Power, Fresh, Water, and Food from Cold, Deep Sea Water", Science, vol. 182, No. 4108, Oct. 1973, p. 121.
Roels O. A. et al, "Artificial Upwelling," (Abstract only), Offshore Technology Conference, Paper No. OTC 1179.
Roels O. A. et al, "Organic Production Potential of Artificial Upwelling Marine Culture," Seminar on Microbial Energy Conversion, Oct. 1976.
Ryther J. H. et al, "Anaerobic Digestion and Nutrient Recycling of Small Benthic or Floating Seaweeds," Energy from Biomass and Wastes V symposium, Jan. 1981, pp. 383-410.

Toyota T. et al, "Design of a Deep Sea Water Supply System for Mariculture" (Abstract only).
Gas Research Institute, "Survey of Commercial Seaweed Production for the Marine Biomass Program," GRI=91/0010, PB91-141895, 1981.
"Algal Refossilization of Atmospheric $CO_2$," Report No. EAR-7401, Neushul Mariculture, Inc., Jul. 1991.
"A Summary Description of the Second Workshop on the Role of Macroalgal Oceanic Farming in Global Change", Electric Power Research Institute, Report OCBD 7303 (Jul. 23, 24, 1990).
National Research Council Ocean Farming and Global Change Workshop, Washington, D.C., Dec. 6-7, 1989.
Bird K. T. et al, "Seaweed Cultivation for Renewable Resources," 1987, Elsevier Science Publishers, Amsterdam, Netherlands.
Ashare E. et al, "Cost Analysis of Algae Biomass Systems", Dynatech Final Report No. 1738, Mar. 27, 1978, Cambridge, Mass.
Budhraja V. et al, "Systems Analysis of the ocean Food and Energy Farm", Vol. 1: Overall Economic Analysis of the Base Line Design, Jun. 30, 1976, Santa Monica, Calif.

(List continued on next page.)

Primary Examiner—David T. Fox
Assistant Examiner—Elizabeth C. Kemmerer
Attorney, Agent, or Firm—Laurence Coit

[57] ABSTRACT

Disclosed is an open ocean farm structure for attachment of macroalgal plants. The farm structure is made up of linear elements connected with nodes to form a three dimensional truss. The linear elements are composed of tubes containing solid rods which are screw connected to the nodes. The ends of the tubes abut the nodes so that screwing the rods into the nodes puts the tubes in compression. The truss structure thus formed is strong and flexible. Because the truss structure is made of tubes having minimal cross-sectional area, the structure is relatively transparent to the forces of wave motion.

7 Claims, 4 Drawing Sheets

OTHER PUBLICATIONS

Neushul M. et al, "Studies of Biomass Yield from a Near-Shore Macroalgal Test Farm", Journal of Solar Energy Engineering, vol. 107193, Feb. 1985.

National Energy Laboratory of Hawaii, Seawater Quality Data, State of Hawaii Contract No. 23321, Final Report, Mar. 1989.

Spencer D., "A Preliminary Assessment of Carbon Dioxide Mitigation Options", Annual Reviews of Energy and Environment, 16:259-73, 1991.

North W., "Progress in Studies of Oceanic Production of Biomass", Proceedings of Second Annual Symposium-Fuels from Biomass, Jun. 20-22, 1978, Troy, New York.

North W. et al, "Farming Macrocystis at Coastal and Oceanic Sites", Synthetic and Degradative Processes in Marine Macrophytes, pp. 247-264, Walter de Gruyter & Co., 1982.

Neushul M. et al, "Nearshore Kelp Cultivation, Yield and Genetics", Seaweed Culture for Renewable Resources, pp. 69-93, 1987.

Wilcox et al. 1990, "A Summary Description of the Second Workshop on the Role of Macroalgal Oceanic Farming in Global Change", Electric Power Research Institute, Report OCBD 7303.

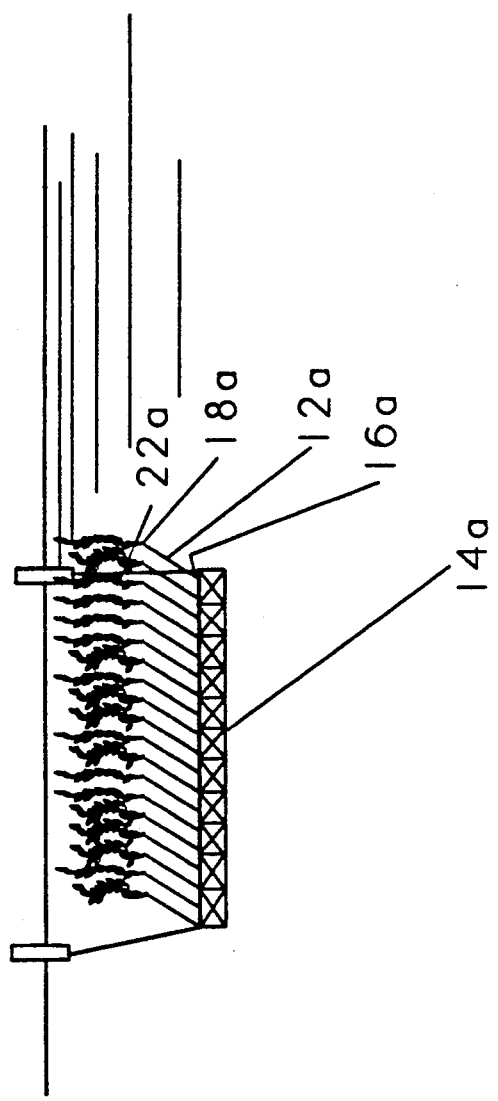

SUBMERGED PLATFORM STRUCTURE FOR OPEN OCEAN MACROALGAL FARM SYSTEMS

BACKGROUND OF INVENTION

1. Field of Invention

This invention relates to a free floating open ocean farming system which produces and harvests macroalgal plants for production of methane and carbon dioxide gases and, more particularly, to a platform structure used to grow the macroalgal plants.

2. Description of Related Art

There is presently a growing concern that continued unabated emissions of carbon dioxide may lead to a global temperature rise or other climatic change. Over the past 100 years, anthropogenic sources of carbon dioxide from fossil fuel use have added approximately 150 gigatons of carbon to the earth's atmosphere. This quantity represents approximately a 25 percent increase over the pre-anthropogenic level. If current projected increases in energy use continue throughout the twenty-first century, it will be extremely difficult to limit maximum carbon dioxide concentration in the earth's atmosphere to twice the pre-anthropogenic levels; i.e. 600 parts per million. Use of the natural algae carbon cycle to refossilize carbon dioxide has been proposed in the articles, "Algal Refossilization of Atmospheric Carbon Dioxide", EAR-7401, July, 1991 Neushul Mariculture, Inc. September 1990 and "A Summary Description of the Second Workshop on the Role of Macroalgal Oceanic Farming in Global Change," Electric Power Research Institute, Report OCBD 7303, (Jul. 23, 24, 1990). In order to seriously consider large-scale carbon dioxide mitigation of 5 to 10 gigatons of carbon annually, it will be necessary to develop large-scale phytomass production systems. Terrestrial systems are limited to perhaps 2-3 gigatons of carbon uptake per year and may not sequester this carbon for periods of centuries. Therefore, it will be necessary if the global carbon buildup affects the global climate as projected, to develop large-scale oceanic based carbon absorption, sequestering, and displacement systems. One such system is that disclosed in patent application Ser. No. 07/956,944, commonly assigned to the assignee of the present application, and hereby incorporated by reference herein.

Open ocean macroalgal farms require a base structure to hold the plants. A variety of macroalgal farm structures for application on the continental shelves or the open ocean have been proposed and, in a few cases, tested in the past. Many of these structures have been destroyed when deployed in open oceans. A successful structure must be able to dissipate very high quantities of energy in order to withstand the forces associated with "orbiting" motions when the system is allowed to drift in a circular pattern. Therefore, it is apparent that what is needed is a macroalgal farm system having satisfactory structural design to retain the algal mat and withstand the tremendous forces imposed by the sea.

SUMMARY OF THE INVENTION WITH OBJECTS

It is one object of the present invention to provide an apparatus for securing macroalgal plants for an open ocean farm.

It is another object of the present invention to provide a strong, flexible open ocean farm structure which is capable of withstanding the forces imposed by the sea.

These and other objects are attained by an open ocean farm structure made up of linear elements connected with nodes to form a three dimensional truss. The linear elements are composed of tubes containing solid rods which are screw connected to the nodes. The ends of the tubes abut the nodes so that screwing the rods into the nodes puts the tubes in compression. The truss structure thus formed is strong and flexible. Because the truss structure is made of tubes having minimal cross-sectional area, the structure is relatively transparent to the forces of wave motion.

BRIEF DESCRIPTION OF DRAWING

FIG. 1a is a sectional view of a macroalgal farm using the platform of the present invention.

DESCRIPTION OF THE PREFERRED EMBODIMENT

Figure 1:
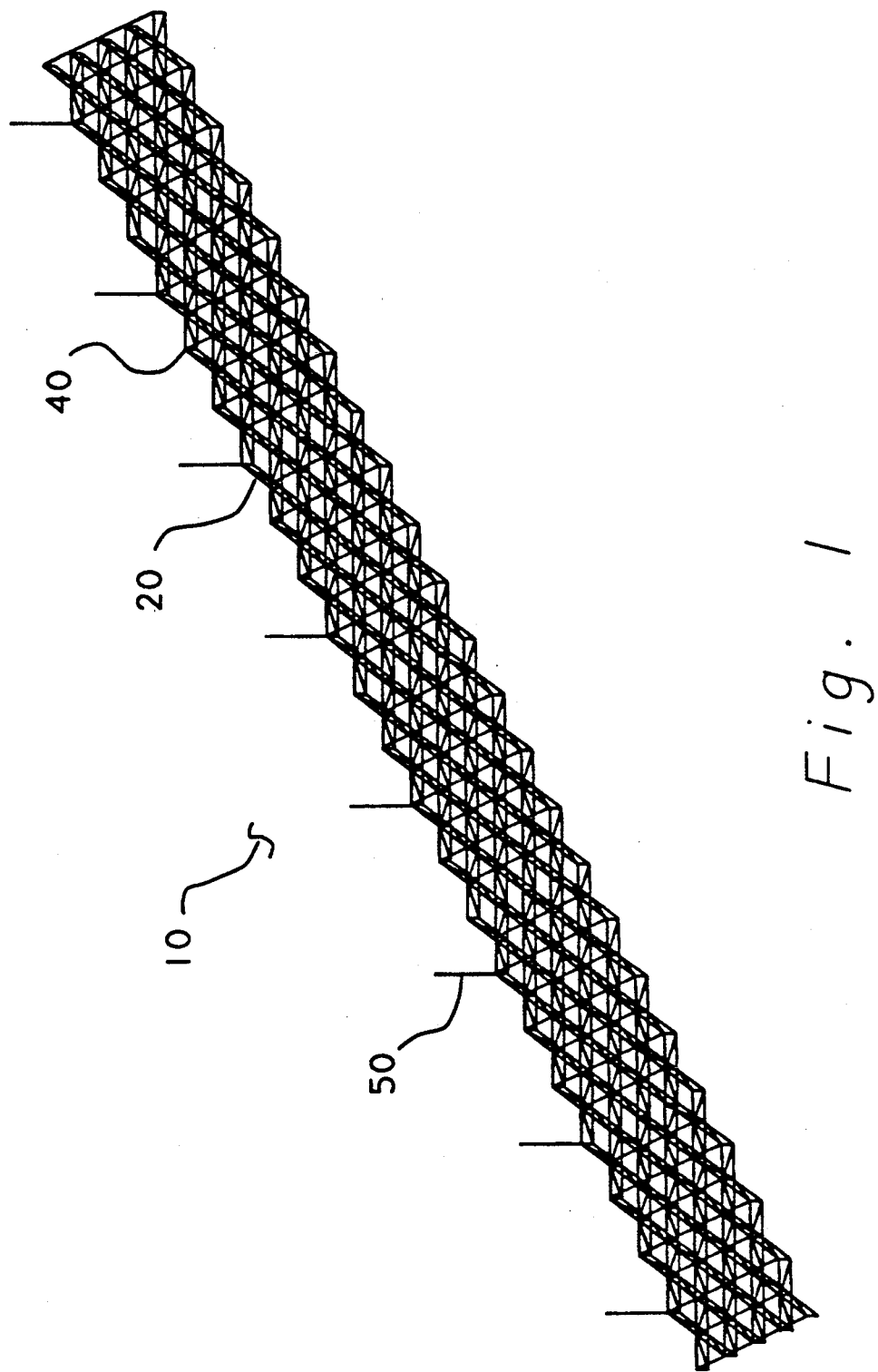
FIG. 1 shows a perspective view of an 80 by 745 foot segment of the macroalgal farm structure.

Turning now to FIG. 1, the design of an 80 by 745 foot segment of the 1,000 acre farm structure 10 is depicted. The criteria governing the design of the support structure are the need for macroalgal plant survival, structural redundancy, storm transparency, and low cost. The structural design of the present invention achieves all of these criteria and the design/analysis of this structure for an orbiting/towed farm is technically feasible. The structure 10 consists of multiple linear elements 20 connected by nodes 40. The structure 10 has a slight negative buoyancy so that it can be positioned at an optimal depth in the euphotic zone to maximize plant growth. To maintain the desired depth, buoys (not shown) are attached to buoy lines 50, the length of which are adjusted to obtain the proper structure depth. The truss structure of the present design provides sufficient strength to withstand forces generated by a 50 foot design wave with a 12 second period from any direction relative to the platform structure. Macroalgal species of various types are utilized depending on local oceanic temperatures. Examples include *Macrocystis pyrifera, Gracilaria tihvahiae*, Laminaria, Sargassum, and Euchema. Each of these species has varying growth rates in open ocean conditions including temperature, nutrient, and carbon availability variations. Growth rates may vary from 1 to 40 gm $C/m^2$ day for natural species under various degrees of optimal growing conditions. Turning now to FIG. 1a, the platform of the present invention is depicted in a macroalgal farm. The plants 22a are connected to submerged platform 14a by buoyant tethers 12a. These tethers are formed from any sea water and corrosion resistant material with sufficient strength such as nylon, dacron or kevlar cordage. The upper ends of tethers 12a terminate in holdfasts 18a for connecting to the plants. The holdfasts will be 1-2 foot diameter buoys, tethered approximately 30-40 feet below the ocean surface. Each buoy on 10-20 foot centers acts as the tie-down (holdfast) location for an individual macroalgal plant. The macroalgal plants are attached to the holdfast by a) tying them to the tether underneath the buoy, b) attaching them to a wraparound line over the buoy, or c) attaching them to the lines penetrating the buoy. The plants may be attached either immediately after submergence of the top structure nodes, as the structure is winched into the water, or at a depth of 30–50 feet by divers once the structure, tethers, and buoys are fully submerged. The tethers 12a are attached to the platform 14a with swivels 16a to prevent accumulated torque in the tether from twisting and kinking the tethers. The tethers 12a are spaced apart from one another sufficiently to prevent adjacent tethers and plants from becoming entangled. Another consideration for preventing entanglement of the plants is the length of the tethers 12a. The length of the tethers 12a along with the intertether spacing must be adjusted to allow free wave movement of the plants without entanglement. The inventor has found that tethers with lengths of approximately 30 to 40 feet and attached at approximately 10 to 20 foot centers, provide the necessary freedom of movement for the individual plants.

Figure 2:
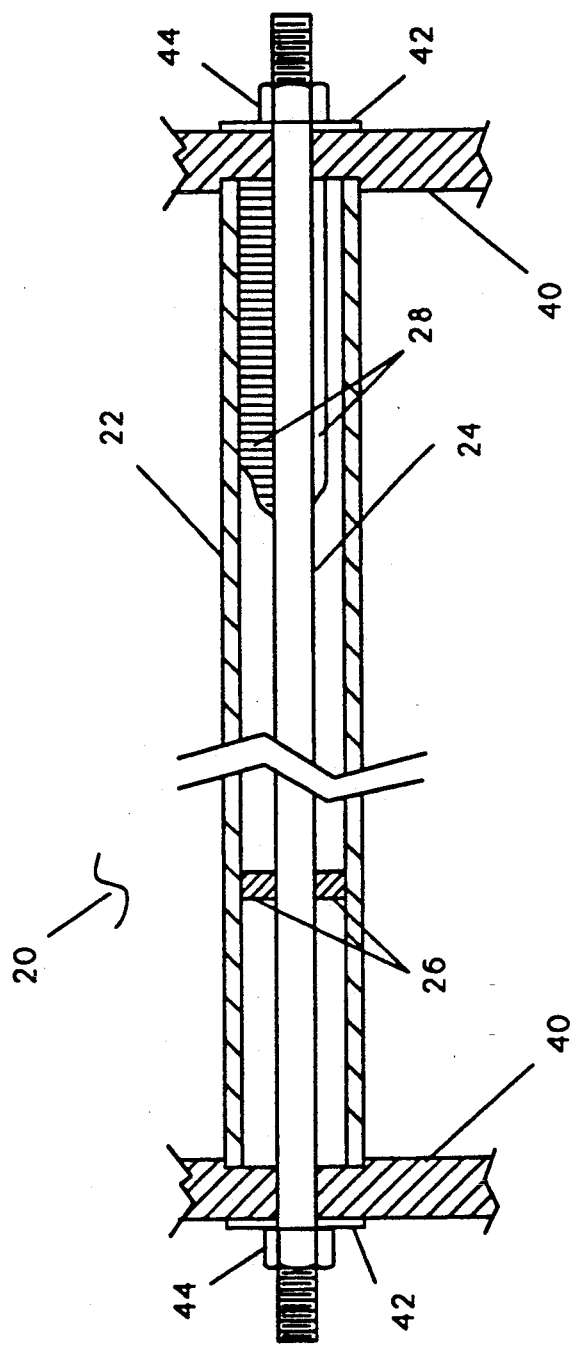
FIG. 2 shows a cut away view of the linear elements used in the macroalgal farm structure.

Referring now to FIG. 2, the truss structure linear elements 20 for the macroalgal support system are approximately 2" diameter plastic tubes 22 that are prestressed by tensioned rods 24. Rods 24 are made of steel or corrosion resistant material such as stainless steel or monel. Rigid polyvinyl chloride was selected as tube material because of its good fatigue properties and low cost. The tubes 22 are prestressed to reduce the size of the elements. The rods 24 are threaded on each end and the ends extend through the walls of nodes 40.

Figure 3:
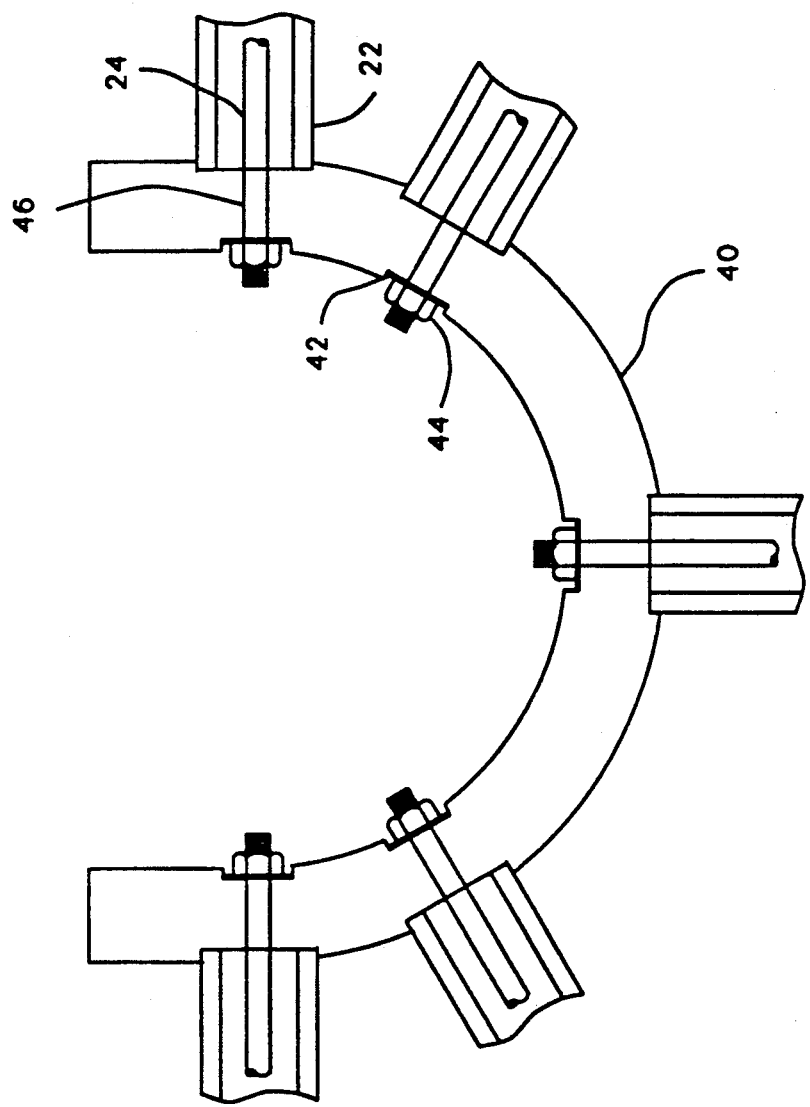
FIG. 3 shows a section view of a node used to connect the linear elements of the macroalgal farm structure.

A typical node is of molded plastic construction and is shown in FIG. 3. Node 40 is a hollow hemisphere containing a plurality of apertures 46. The ends of rods 24 extend through apertures 46 and are held in place by washers 42 and nuts 44. The ends of tubes 22 abut the exterior surfaces of nodes 40 around apertures 46. Each end of tube 22 is attached to a node 40 in this manner. Therefore, as nut 44 is tightened on rod 24, nodes 40 are forced against the ends of tube 22 putting the tube 22 in compression and the rod 24 in tension.

Referring back to FIG. 2, within tubes 22, rods 24 are centralized with one inch thick plastic disks 26 spaced at two foot centers along the rod in order to increase buckling resistance. An alternate method of increasing buckling resistance is to use tubes having a plurality of internal, longitudinal fins 28 which hold rod 24 centralized within tube 22. Three fins 28 radially spaced at 120° are sufficient to provide buckling resistance. The rods 24 are tensioned by nuts 44 being tightened against washers 42 which bear against the interior surfaces of nodes 40. A unique characteristic of prestressing is that slender elements can be prestressed to high loads, without buckling. Because the components are equal in length, the stiffness is a function of cross-sectional area and modulus of elasticity. For the support structure, the polyvinyl chloride has a much lower modulus than steel, and, although it has a greater area, its stiffness is much less than that of the rod and therefore it would only need to resist approximately 5% of the applied axial load. The remaining 95 percent of the load would be resisted by a reduction of tensile load in the rod.

The proposed orbiting/towed support structure consists of components that do not require difficult or complex fabrication. The truss elements are the major support structure components and consist of plastic tubes, steel rods, and plastic spacers for centralizing the rods in the tubes. Plastic extrusion and molding for tubes 22, spacer 26, and node 40 fabrication may be performed on shore or on floating fabrication facilities.

Since the tubes 22 are hollow, they can be used to distribute nutrients to the macroalgal plants being grown. In addition, carbon dioxide produced by a digester which processes the plants can be distributed through tubes 22 to "aerate" the macroalgal farms by percolating the gas up through the canopy of plants. In the case where tubes 22 contain spacers 26 to hold rods 24 in a centralized position, spacers 26 require apertures to allow free flow of nutrients through tubes 22. When rods 24 are held centralized by fins 28, flow of nutrients through tubes 22 is unimpeded by the fins 28. Provision of additional nutrients in this manner enhances the rate of biological fixation of carbon per unit time and space and increases the overall photosynthetic conversion efficiency.

Having thus described an exemplary embodiment of the invention, it is readily understood that those skilled in the art may change certain aspects and features of the invention such as details of the submerged platform or particular methods used to connect the various components of the structure without departing from the scope or intent of the invention.

We claim:

1. A waterborne macroalgal farm structure for the attachment of macroalgal plants comprising a three dimensional truss formed from:
   a. flexible, hollow tubes;
   b. nodes abutting each end of said tubes;
   c. rods contained within said tubes and attached to said nodes in an adjustable length method to tension said rods and compress said tubes, wherein macroalgal plants are attached to said tubes;
   whereby connection of said tubes, rods and nodes forms a three dimensional waterborne platform.

2. A waterborne macroalgal farm structure as recited in claim 1 further comprising spacers mounted between the exterior surfaces of said rods and the interior surfaces of said tubes to maintain said rods at a generally concentric location within said tubes.

3. A waterborne macroalgal farm structure as recited in claim 1 wherein said tubes are formed from polyvinyl chloride.

4. A waterborne macroalgal farm structure as recited in claim 1 further comprising tethered buoys attached to said structure, said structure having a slightly negative buoyancy and therefore the depth of submergence of said structure can be adjusted by adjusting the length of said tethers.

5. A waterborne macroalgal farm structure as recited in claim 1 wherein said hollow tubes are used to distribute liquid nutrients to the plants in said macroalgal farm.

6. A waterborne macroalgal farm structure as recited in claim 2 wherein said spacers are round disks having a centralized aperture for passage therethrough of said rod.

7. A waterborne macroalgal farm structure as recited in claim 2 wherein said spacers are a plurality of longitudinal fins mounted within said tube for holding said rod in a centralized position within said tube.

* * * * *